June 10, 1924.  
E. A. PURDY  
PASTRY BOARD  
Filed March 10, 1923
1,497,228
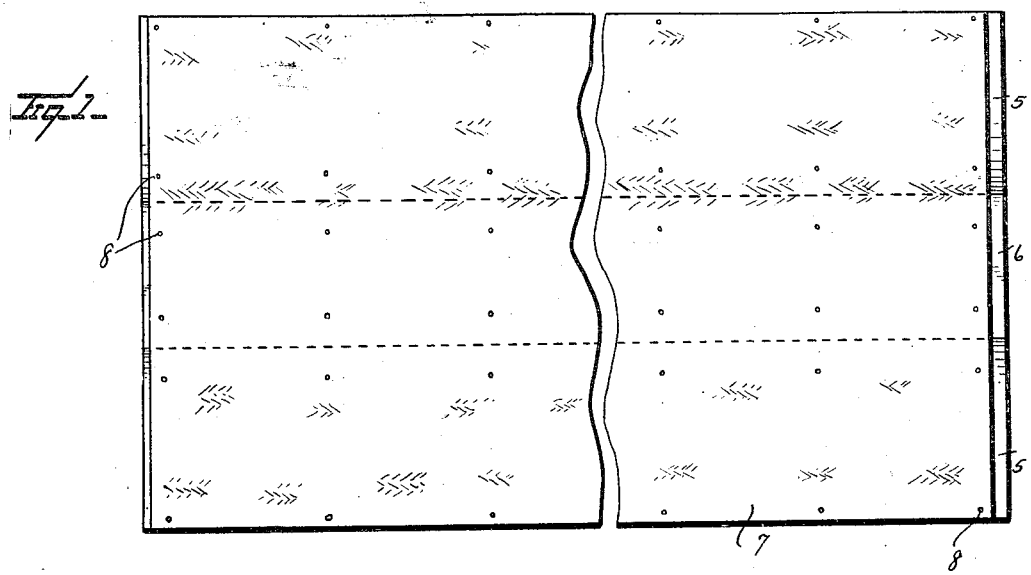
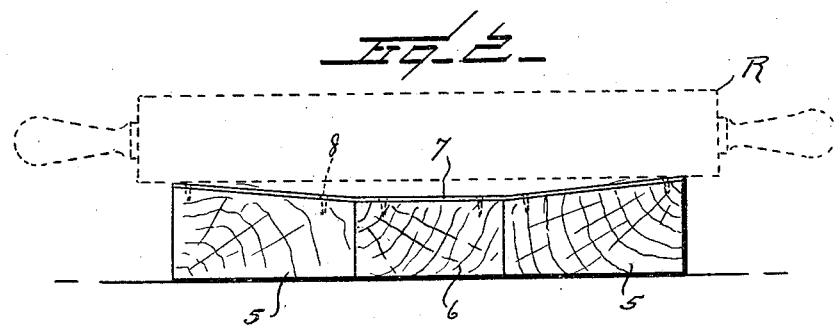
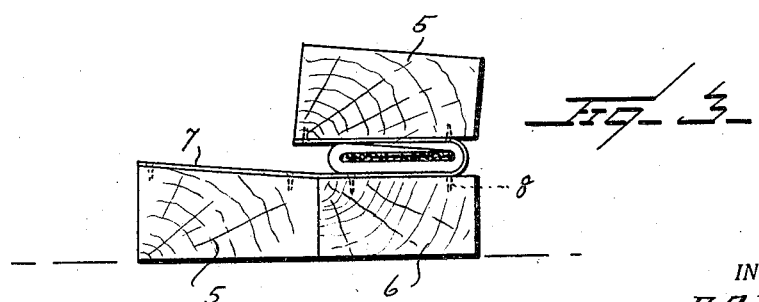
INVENTOR.  
E.A.Purdy  
BY Watson E. Coleman  
ATTORNEY.

Patented June 10, 1924.

1,497,228

UNITED STATES PATENT OFFICE.

EDWARD A. PURDY, OF LAMAR, COLORADO.

PASTRY BOARD.

Application filed March 10, 1923. Serial No. 624,199.

*To all whom it may concern:*

Be it known that I, EDWARD A. PURDY, a citizen of the United States, residing at Lamar, in the county of Prowers and State of Colorado, have invented certain new and useful Improvements in Pastry Boards, of which the following is a specification, reference being had to the accompanying drawings.

This invention relates to certain new and useful improvements in pastry boards, and particularly to a board whereon the dough may be rolled and by means of which the rolled dough may be subsequently folded in the manufacture of composite confection such as cakes having a filling, one example of which is the cake now generally known as "Fig Newtons".

The primary object of the invention is to provide a dough folding pastry board for facilitating the manufacture of cakes having a filling wherein the board is of an extremely simple and durable construction and capable of being readily placed in use without the requirement of particular skill.

Another object of the invention is to provide a dough folding board upon which dough may be rolled into sheet-like form with the central portion of the sheet of dough thicker than the longitudinal side portions thereof so that when these side portions of the dough are folded one upon the other and upon the filling which is placed upon the central portion of the sheet of dough, the dough at both sides of the product will be of substantially the same thickness.

A further object is to provide a board of this kind embodying a central section with side sections hinged thereto and adapted for alternate swinging movement for folding onto the central section so that the sides of the sheet of dough are folded onto the filling and upon each other.

With the above general objects in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views:—

Figure 1 is a top plan view partly broken away of a pastry board constructed in accordance with the present invention;

Figure 2 is an end elevational view thereof and illustrating a rolling pin by dotted lines in proper relation thereto when rolling the dough into sheet-like form; and Figure 3 is a view similar to Figure 2 with one of the side sections of the board in folded position.

Referring more in detail to the several views, the present invention embodies a substantially rectangular pastry board composed of three longitudinal sections placed side by side and hingedly connected along their adjacent edges whereby the side board sections 5 may be selectively folded onto the central board section 6. The preferred construction consists in providing the board with a covering sheet 7 of flexible material such as fabric, rubber cloth or rubber, which covering substantially conforms in area to the combined areas of the upper surfaces of the sections 5 and 6. This covering is fastened securely to the upper surfaces of the board sections in any suitable manner such as by means of tacks 8 or the like extending through the covering at points adjacent the longitudinal edges of the board sections and entering the latter.

The side sections 5 are provided with flat under surfaces, while their upper surfaces gradually incline laterally toward the central section 6, and said central section is of the same thickness as the adjacent edges of the section 5. Also, the top and bottom surfaces of the section 6 are substantially flat. It will thus be seen that when the rolling pin R is disposed transversely of the board so as to rest upon the side edges of the outer sections 5 and then moved longitudinally of the board, the dough will be caused to assume a sheet-like form with a central portion of substantially uniform thickness throughout and with side portions of lesser thickness.

The covering not only provides the required hinge connections between the board sections, but also prevents the dough from being forced between the adjacent edges of the sections.

In use, after the dough has been rolled in the sheet-like form above outlined, the filling material is suitably spread upon the central portion of the dough so as to substantially conform in area, width and length to the central portion 6 of the board. The side sections 5 are then alternately swung upwardly and inwardly as is illustrated with respect to one of the sections in Figure 3 so that the side portions of the sheet of dough are folded onto the filling and onto each other with the super-posed side portions of the sheet of dough forming a wall of dough of the required thickness and of substantially uniform thickness. The product may then be placed in a suitable pan and subjected to a baking process in the well known manner.

From the foregoing description it is believed that the construction and operation as well as the advantages of the present invention will be readily understood and appreciated by those skilled in the art.

Minor changes may be made without departing from the spirit and scope of the invention as claimed.

What is claimed is:—

1. A dough folding pastry board embodying a central and a pair of side longitudinal sections, and a flexible covering secured on said sections and hingedly connecting the same whereby the side sections may be folded onto the central section.

2. A dough folding pastry board embodying a central and a pair of side longitudinal sections, and a flexible covering secured on said sections and hingedly connecting the same whereby the side sections may be folded onto the central section, the central section being provided with substantially flat upper and lower surfaces, the side sections being formed with flat bottom surfaces and having laterally inclined upper surfaces which incline toward the central section and terminate with their lowest points in substantially the same plane as the upper surface of the central section.

3. A pastry board including a central section of uniform thickness, and a pair of side sections hinged thereto, the side sections increasing in thickness from their junctures with the central section to their outermost edges.

4. A pastry board comprising a central section and a pair of side sections disposed against opposite sides thereof and having their lower surfaces coplanar with the lower surface of the central section and their upper surfaces inclined upwardly and outwardly with respect to the top surface of the central section.

5. A dough folding pastry board comprising a central section of uniform thickness, a pair of side sections disposed thereagainst and having their upper surfaces inclined upwardly and outwardly with respect to the top surface of the central section, and means hingedly connecting said sections.

In testimony whereof I hereunto affix my signature.

EDWARD A. PURDY.